US012148046B1

(12) United States Patent
Castro

(10) Patent No.: US 12,148,046 B1
(45) Date of Patent: Nov. 19, 2024

(54) TAX PLANNING USING VIDEO-BASED GRAPHICAL USER INTERFACE AND ARTIFICIAL INTELLIGENCE

(71) Applicant: AiTax Corporation, Dallas, TX (US)

(72) Inventor: John Anthony Castro, Mansfield, TX (US)

(73) Assignee: AITAX.COM, INC., Mansfield, TX (US)

( * ) Notice: Subject to any disclaimer, the term of this patent is extended or adjusted under 35 U.S.C. 154(b) by 0 days.

(21) Appl. No.: 18/540,312

(22) Filed: Dec. 14, 2023

Related U.S. Application Data

(63) Continuation of application No. 18/154,538, filed on Jan. 13, 2023, now Pat. No. 11,847,707, which is a continuation-in-part of application No. 17/870,318, filed on Jul. 21, 2022, now Pat. No. 11,556,999, which is a continuation of application No. 17/569,170, filed on Jan. 5, 2022, now Pat. No. 11,397,995, which is a continuation of application No. 17/354,554, filed on Jun. 22, 2021, now Pat. No. 11,257,167.

(60) Provisional application No. 63/369,874, filed on Jul. 29, 2022, provisional application No. 63/049,465, filed on Jul. 8, 2020.

(51) Int. Cl.
| | |
|---|---|
| *G06Q 40/10* | (2023.01) |
| *G06N 5/04* | (2023.01) |
| *G06N 20/00* | (2019.01) |
| *G06Q 10/10* | (2023.01) |
| *G06Q 30/018* | (2023.01) |
| *G06Q 40/12* | (2023.01) |
| *G06Q 50/18* | (2012.01) |
| *G06Q 50/26* | (2012.01) |

(52) U.S. Cl.
CPC ............... *G06Q 40/10* (2013.01); *G06N 5/04* (2013.01); *G06N 20/00* (2019.01); *G06Q 10/10* (2013.01); *G06Q 30/018* (2013.01); *G06Q 40/123* (2013.12); *G06Q 50/18* (2013.01); *G06Q 50/26* (2013.01)

(58) Field of Classification Search
CPC ...... G06Q 40/10; G06Q 40/123; G06Q 10/10; G06Q 30/018; G06Q 50/18; G06Q 50/26; G06N 5/04
See application file for complete search history.

(56) References Cited

U.S. PATENT DOCUMENTS

2017/0228655 A1* 8/2017 Alarie .................... G06Q 10/10

* cited by examiner

*Primary Examiner* — Aryan E Weisenfeld
(74) *Attorney, Agent, or Firm* — HAYNES AND BOONE, LLP

(57) ABSTRACT

A apparatus and method of generating and presenting a recommended filing strategy that includes receiving user inputs via a graphical user interface; identifying, using one or more computers, factual patterns of the user inputs; assigning, using the one or more computers and based on the identified factual patterns, a risk tolerance classification; generating, using an optimization model and based on the factual patterns, the risk tolerance classification, and relevant legal documents, the recommended filing strategy; identifying relevant media files from a library of media files that are associated with the recommended filing strategy; creating a combined media file from the plurality of relevant media files; and presenting the combined media file via the graphical user interface.

20 Claims, 8 Drawing Sheets

TAX PLANNING USING VIDEO-BASED GRAPHICAL USER INTERFACE AND ARTIFICIAL INTELLIGENCE

CROSS-REFERENCE TO RELATED APPLICATIONS

This application is a continuation of U.S. patent application Ser. No. 18/154,538, filed Jan. 13, 2023, which is a continuation-in-part (CIP) of U.S. patent application Ser. No. 17/870,318, filed Jul. 21, 2022, now U.S. Pat. No. 11,556,999, the entire disclosures of which are hereby incorporated herein by reference. U.S. patent application Ser. No. 17/870,318 is a continuation of U.S. patent application Ser. No. 17/569,170, filed Jan. 5, 2022, now U.S. Pat. No. 11,397,995, which is a continuation of U.S. patent application Ser. No. 17/354,554, filed Jun. 22, 2021, now U.S. Pat. No. 11,257,167, which claims the benefit of the filing date of, and priority to, U.S. Provisional Application No. 63/049,465, filed Jul. 8, 2020, the entire disclosures of which are hereby incorporated herein by reference.

U.S. patent application Ser. No. 18/154,538 also claims the benefit of the filing date of, and priority to, U.S. Provisional Application No. 63/369,874, filed Jul. 29, 2022, the entire disclosure of which is hereby incorporated herein by reference. U.S. Patent Application No. 63/369,874 is related to: U.S. patent application Ser. No. 17/870,318, filed Jul. 21, 2022; U.S. patent application Ser. No. 17/569,170, filed Jan. 5, 2022, now U.S. Pat. No. 11,397,995; U.S. patent application Ser. No. 17/354,554, filed Jun. 22, 2021, now U.S. Pat. No. 11,257,167; and U.S. Provisional Application No. 63/049,465, filed Jul. 8, 2020, the entire disclosures of which are hereby incorporated herein by reference.

BACKGROUND

This disclosure relates to tax planning using a video-based graphical user interface and artificial intelligence.

DETAILED DESCRIPTION

In an example embodiment, as illustrated in one or more of the FIGS. 1-7, a tax planning system that includes a video-based graphical user interface results in customized compilation video that, in some embodiments, relates to creative legal positions. The system can be used to present, via the graphical user interface, a tax opinion or advice that is customized to the user. This opinion or advice is "on demand" to the user in some embodiments.

In some embodiments, the system includes a "confidence threshold" associated with the tax opinion or advice. In some examples, the "confidence threshold" is based on existing case law and/or other judiciary data. For example, case law stemming from different courts may be weighted differently based on the judge(s) that issued the opinion and/or the court that issued the opinion. For example, a holding from the Second Circuit Court of Appeals may be weighted heavier than a holding from the Ninth Circuit Court of Appeals. Moreover, whether the opinion was unanimous, or a split decision is also considered, as well as which judges sided with the majority or dissent. In some cases, appointment details relating to each judge are considered as well.

Figure 1:
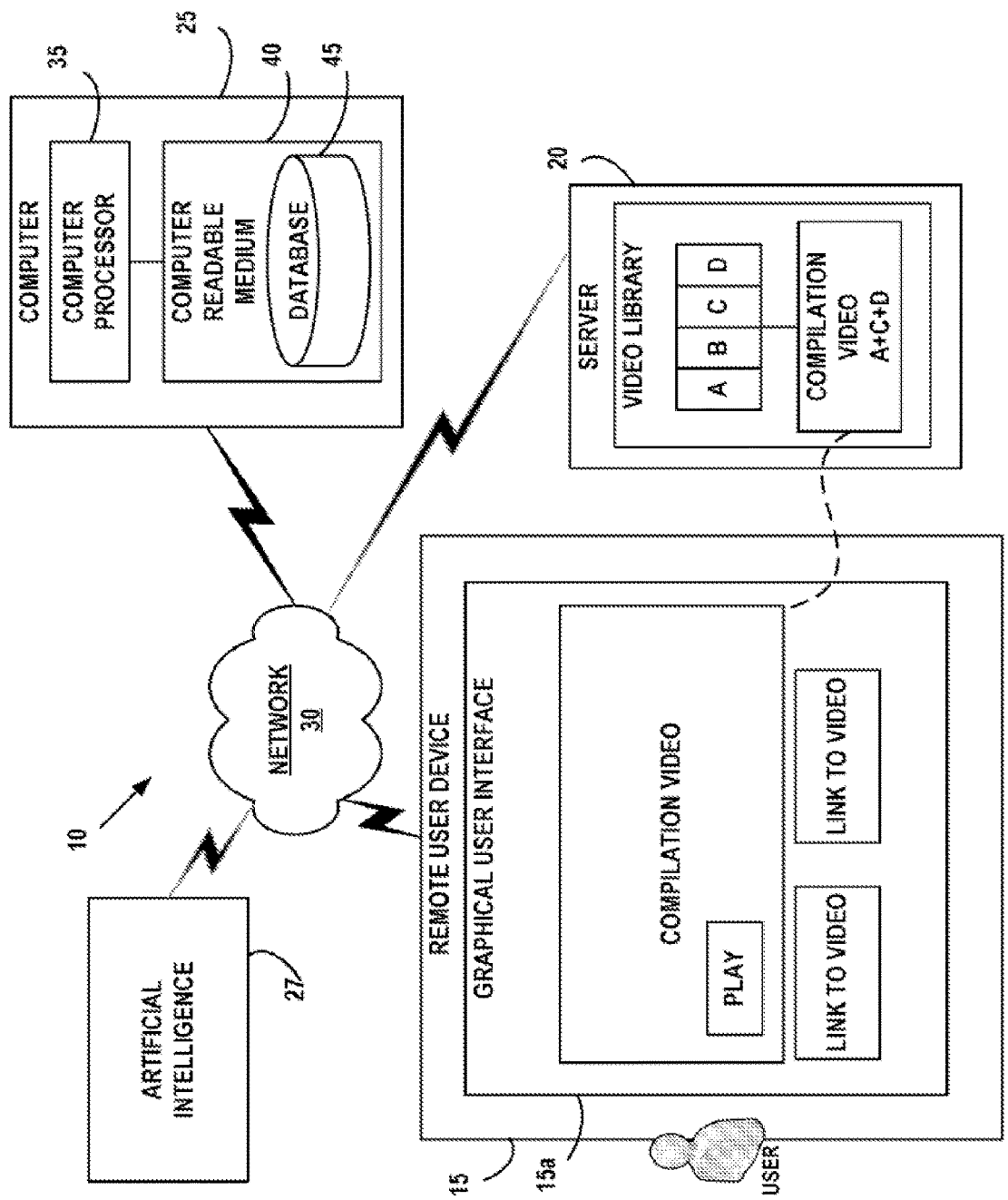
FIG. 1 is a diagrammatic illustration of a system according to an example embodiment, the system including a remote user device, the remote user device including a graphical user interface.

In an example embodiment, referring to FIG. 1, a system 10 includes a remote user device 15 that includes a graphical user interface 15a, a server 20, a computer 25, and artificial intelligence ("AI") 27 connected via a network 30. Generally, the computer 25 includes a computer processor 35 and a non-transitory computer readable medium 40 operably coupled thereto. Instructions accessible to, and executable by, the computer processor 35 are stored on the computer readable medium 40. A database 45 is also stored in the computer readable medium 40. In some embodiments, the user provides inputs to the system 10 via a window that is displayed on the GUI 15a but may provide inputs using different input mechanisms. In some embodiments, a video from a video library stored in the server 20 is displayed on the GUI 15a. In other embodiments, a compilation video that is formed from one or more videos in the video library is displayed on the GUI 15a. In some embodiments, the server 20 is part of the computer 25. In some embodiments, the computer 25 is part of the server 20.

Figure 2:
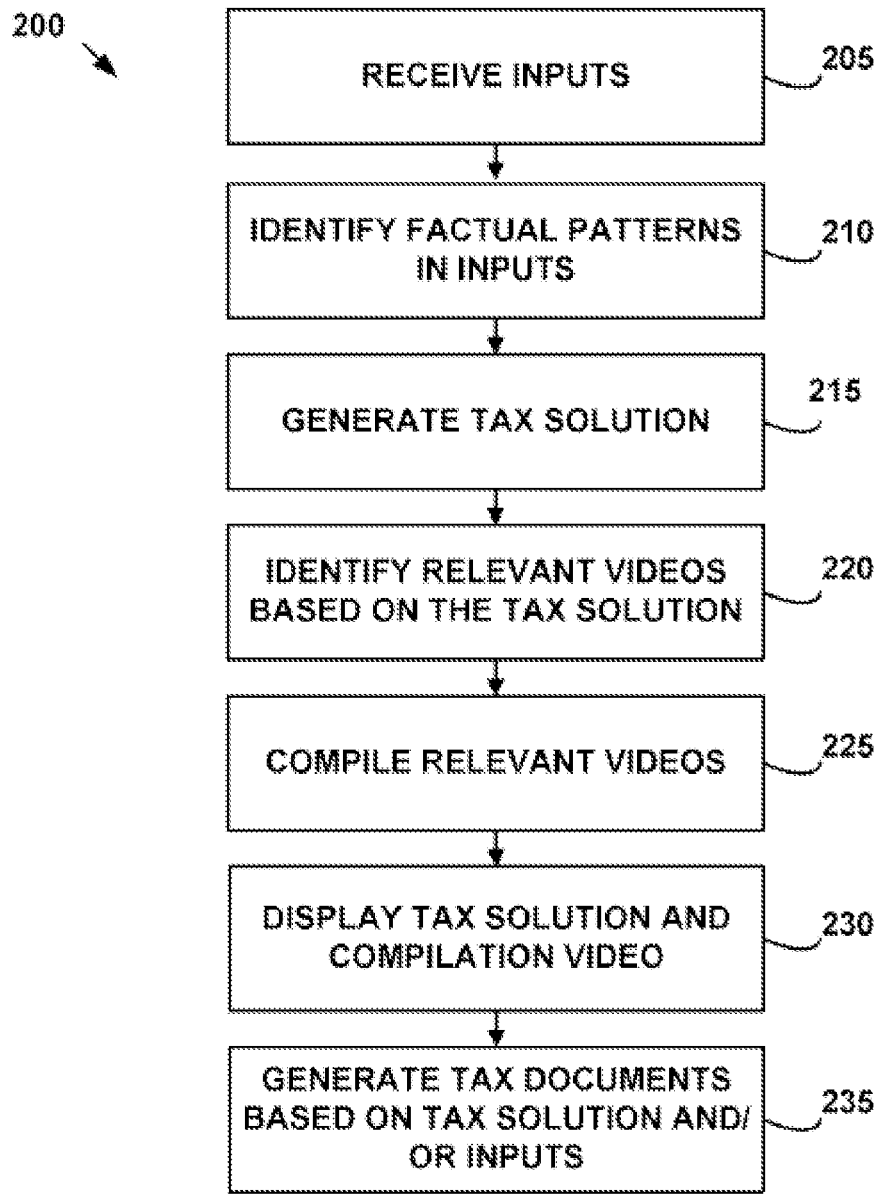
FIG. 2 is a flow chart illustration of a method of operating the system of FIG. 1, according to an example embodiment.

In an example embodiment, as illustrated in FIG. 2 with continuing reference to FIG. 1, a method 200 includes receiving inputs at step 205; identifying factual patterns in the inputs at step 210; generating a tax solution at step 215; identifying relevant videos based on the tax solution at step 220; compiling relevant videos at step 225; displaying the tax solution and compilation video at step 230; and generating tax documents based on the tax solution and/or the inputs at step 235.

Figure 3:
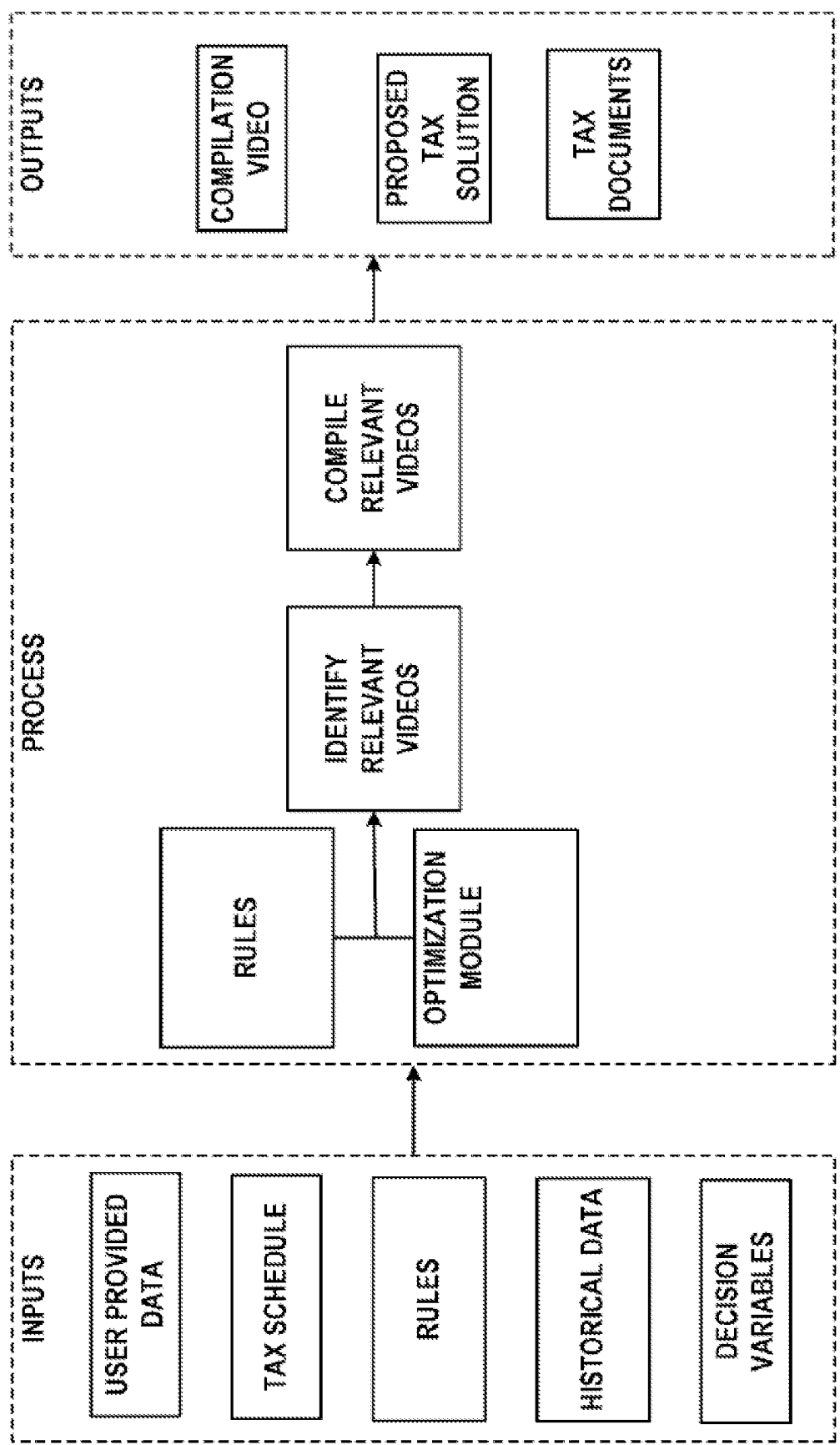
FIG. 3 is a data flow diagram associated with the system of FIG. 1, according to an example embodiment.

In some embodiments and at step 205, the inputs are received. FIG. 3 illustrates one embodiment of a data flow associated with the system 10. Generally, at least a portion of the inputs are received via the GUI, but could also be received via a microphone, keyboard, or other input mechanism. In some embodiments, the inputs may include user provided data, a tax schedule, rules, historical data, and decisions variables.

Figure 4:
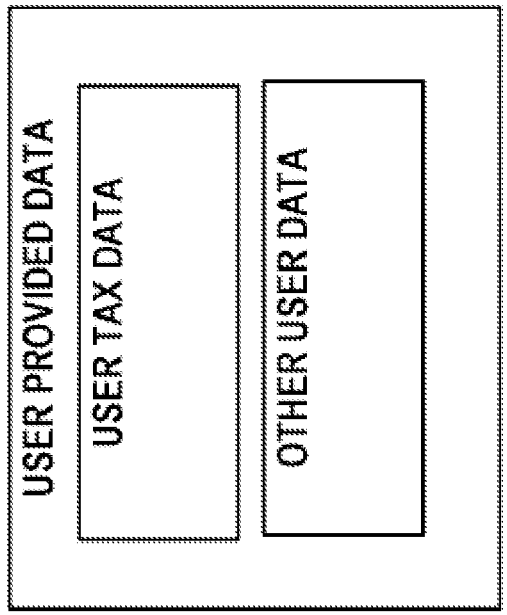
FIG. 4 is listing of user-provided data used by the system of FIG. 1, according to an example embodiment.

In some embodiments and as illustrated in FIG. 4, the user provided data may include user tax data and other user data. User tax data may include data that is relevant to the user's potential tax liability, which includes data relating to a potential tax deduction, expenses, losses, investments, depreciation, indebtedness, potential tax credit, expenditures, gains, carryovers, charitable contributions, etc. In some embodiments, other user data may be related to a psychological profile of the user and/or related to data useful in a risk tolerance evaluation of the user. In some embodiments, the system 10 accessing data is the same as the system 10 receiving data in the step 205. That is, the step 205 includes the system 10 accessing data related to the user from another system. For example, the user may provide permission to the system 10 to access his or her data (i.e., user tax data or other user data) by allowing the system 10 to access his or her most recent or historical Form W-2, Schedule K-1, etc.

Figure 5:
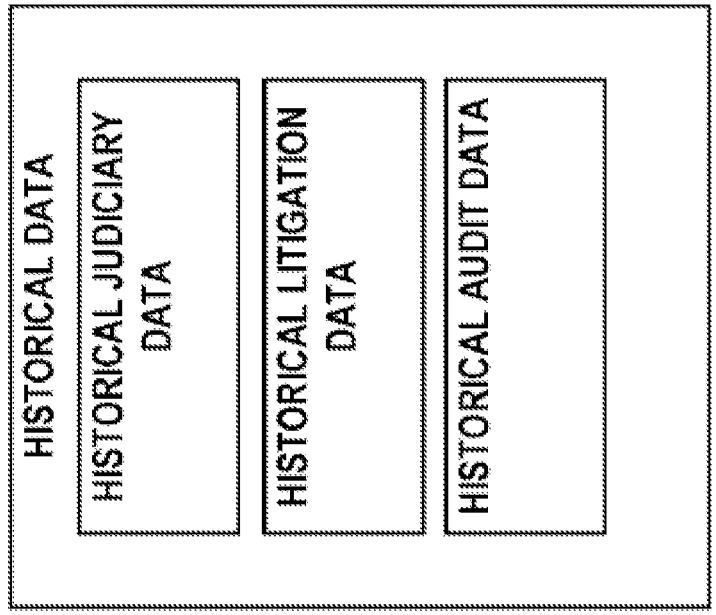
FIG. 5 is listing of historical data used by the system of FIG. 1, according to an example embodiment.

In some embodiments and as illustrated in FIG. 5, historical data may include historical judiciary data, historical litigation data, and/or historical audit data. The historical judiciary data may include data relating to judges themselves (e.g., appointment data, decision data, etc.), as well as data relating to specific case law (e.g., court from which case law was issued, compilation of judges for panel review, specific facts relating to opinions, etc.). In some embodiments, the historical audit data includes data relating to audits or other reviews performed by an administrative or other governmental body.

Referring back to FIGS. 2 and 3, at the step 210, factual patterns are identified by the system 10. Generally, the system 10 analyzes data provided by the client/user and applies said user-provided data to a previously unknown and novel formulaic technique involving sets of pre-programmed mathematical models, collections of algorithms, and sets of rules to both accurately identify and score the strengths of applicable legal authorities, the ideological inclinations of federal judges, and the ideology of the executive branch when any administrative rulings were issued with self-adjustments for evolutionary computation. In some embodiments, the step 210 includes an optimization module that includes the sets of pre-programmed mathematical models and collections of algorithms. In some embodiments, the optimization module references the rules or otherwise includes the rules. Regardless, the inputs are used by the optimization module and the rules to identify factual patterns.

In some embodiments and at the step 215, the system 10 generates a tax solution. Using the identified factual patterns, the system 10 generates a tax solution. In some embodiments, the tax solution depends on the user's risk tolerance. The tax solution may include proposed actions to be taken in the future to adjust one's tax liability and/or may include classifying past actions/expenses differently to affect one's tax liability. In some embodiments, the tax solution may include adopting or relying on a legal position relating to one's tax liability or classification. In some embodiments, the system 10 identifies or associates key identifiers with the tax solution. For example, the tax solution may be associated with a key identifier of "exit tax planning" or "offshore tax compliance."

In some embodiments and at step 220, the system 10 identifies relevant videos based on the tax solution. In some embodiments and using the key identifier(s) associated with the tax solution, the system 10 identifies videos within the video library that are relevant to the tax solution. In some embodiments, the identification of the relevant videos is also dependent upon the user's risk tolerance so that the identification of the relevant videos is based on a combination of the key identifier and the user's risk tolerance. The video library may include videos that describe a subject in a manner that is dependent upon the user's risk tolerance. For example, and when the user has a low risk tolerance and the key identifier is "exit tax planning", a first video may highlight the conservative aspects relating to "exit tax planning". Meanwhile, when the user has a high-risk tolerance, a second video may omit the conservative aspects relating to the "exit tax planning."

In some embodiments and at step 225, the system 10 compiles the relevant videos. In some embodiments, the system 10 provides a single video that includes the identified relevant videos. In some embodiments, the system 10 configures the single video such that the transitions between identified videos are smooth and/or not noticeable. Regardless, the compilation video is customized to the user and his or her tax situation and risk tolerance.

In some embodiments and at step 230, the system 10 displays the tax solution and the compilation video. Generally, the tax solution and the compilation video are displayed via the GUI. In some embodiments, the tax solution is the compilation video but in other embodiments the tax solution is a separate file, which may be a word file, a PDF file, or any other type of file that is not limited to a video file. In some embodiments, the compilation video file is a multimedia file. In some embodiments, the system 10 automatically stores the compilation video and associates the compilation video with the user.

In some embodiments and at step 235, the system 10 generates tax documents based on the tax solution and/or the inputs. In some embodiments, the system 10 prepopulates templates using the tax solution and/or the inputs. However, in other embodiments, the system 10 generates a tax opinion based on the tax solution and/or the inputs.

In some embodiments, the AI 27 is a software, service, or platform. In some embodiments, the AI 27 is or includes a machine learning platform. In some embodiments, the AI 27 is or includes IBM Watson, RapidMiner, MATLAB, Tableau Server, RStudio, Azure Machine Learning Studio, or similar.

In some embodiments, the method 200 of FIG. 2 includes using the AI 27 to interact with the user, to receive the inputs, to generate the tax solution, to compile the relevant videos, or any combination thereof. In some embodiments, the AI 27 may be used in one or more of the steps of the method 200.

Regarding the AI 27, there have been a number of challenges to overcome to be able to implement artificial intelligence into tax planning. Two such challenges were how to properly obtain relevant information from a user, and how to properly explain a legal position to a user.

It is understood in law that the tax professional has the sole authority to make decisions regarding strategy and tactic. With that in mind, the user is not legally required to understand the strategy employed in the user's case.

In 1985, the Supreme Court explained, "Whether the [factual] elements that constitute [a legal position] are present in a given situation is a question of fact, but what elements must be present to constitute [the legal position] is a question of law. U.S. v. Boyle, 469 U.S. 241, 249, n.8 (1985). In other words, even the most complex legal strategy can be expressed as a combination of factual elements. This concept is advantageous as factual elements are easier to explain to, and ask of, a user.

The above-mentioned concepts yield two important factors: (1) a software can take a legal position even if the user doesn't understand it; and (2) a legal position is just a set of factual elements. Thus, if the presence of facts that support a legal position can be confirmed, the software can take the legal position without explaining it to the user.

Another challenge that has prevented the implementation of artificial intelligence into tax planning has been the development of a way to structure a set of factual questions in an arrangement or system that captures every possible factual scenario. The prevailing conclusion in the industry is that developing such a structure capable of foreseeing every possible factual scenario is simply not possible.

In order to overcome this obstacle, the tax planning system is created and trained using a plurality of factual scenarios from case law. The law itself (i.e., statutes) is general and broad. The gaps in the statutes are attempted to be filled by regulations promulgated by agencies or other authorized bodies. Further agency rulings help to elaborate on some of the nuances of the statutes and regulations. However, the real clarity with respect to the law and unique factual scenarios comes from the decisions of the courts.

Figure 6:
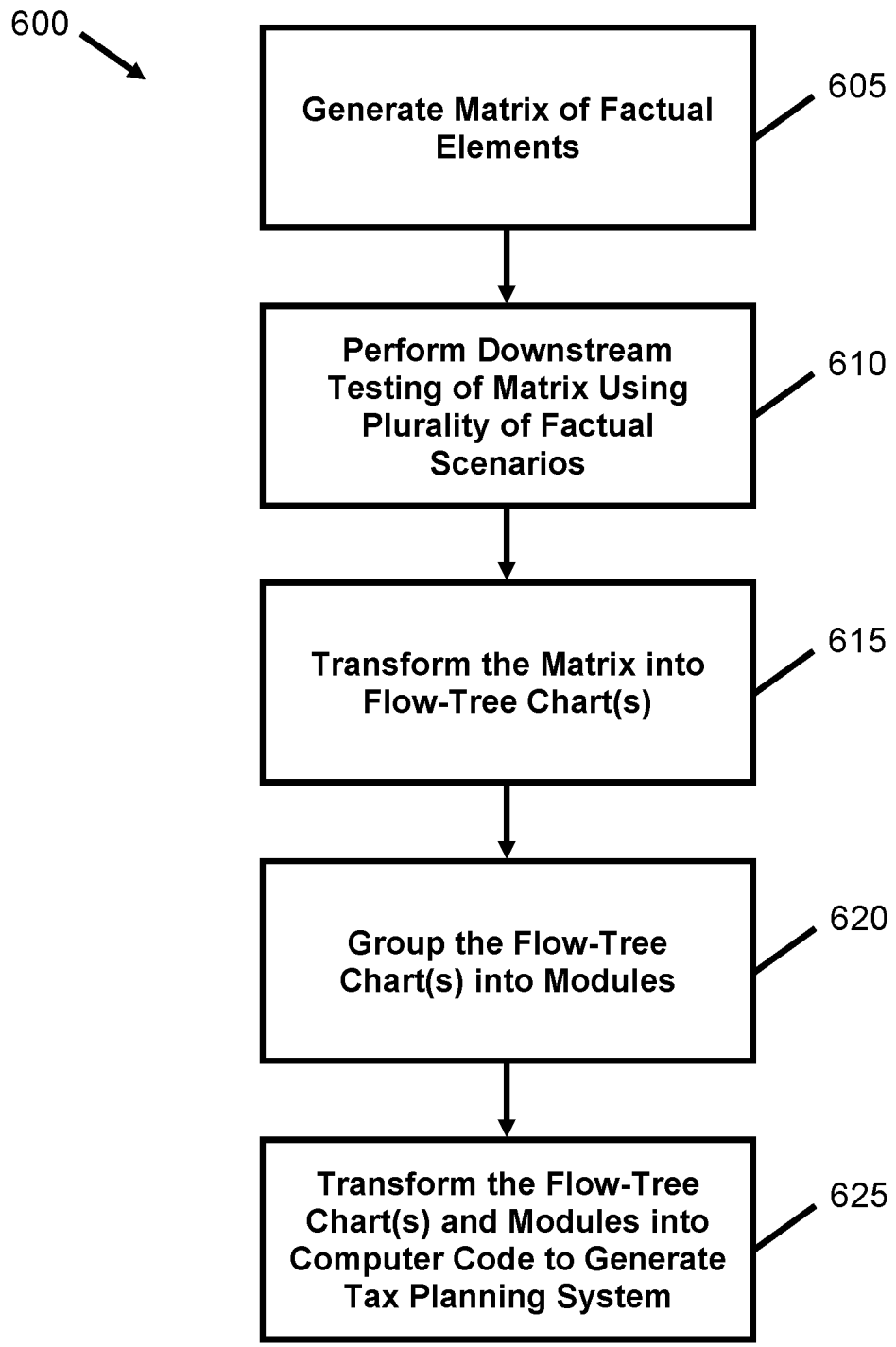
FIG. 6 is a flow chart illustration of a method of creating a portion of the system of FIG. 1, according to an example embodiment.

In an example embodiment, as illustrated in FIG. 6, a method 600 includes generating a matrix of factual elements at step 605; performing downstream testing of the matrix using the plurality of factual scenarios at step 610; transforming the matrix into a flow-tree chart(s) at step 615; grouping the flow-tree charts into a module(s) at step 620; and transforming the flow-tree chart(s) and the module(s) into a computer code to generate the tax planning system at step 625.

With continuing reference to FIG. 6, in one embodiment and at step 605, the qualifications for a dependent with respect to tax planning were analyzed. Regarding the qualifications for a dependent, there is the statute, four intricate regulations, and about 121 settled court cases. In some embodiments, after analyzing the statute, regulations, and case law, the issue of dependency was reduced to 8 factual elements. As illustrated in FIG. 6 and at step 605, the factual elements are then used to generate the matrix of factual elements. In some embodiments, the factual elements are ordered within the matrix based on a hierarchy of relevance.

In some embodiments and at step 610, once the matrix is completed, downstream testing is performed on the matrix of factual elements using the plurality of factual scenarios to evaluate and determine the correctness of the matrix. The matrix is only correct if any factual scenario can be run through it seamlessly downstream.

In some embodiments and at step 615, once the matrix is confirmed as accurate with the downstream approach, the matrix is transformed into the flow-tree chart(s). The flow-tree chart(s) is a diagrammatic representation of an algorithm. In some embodiments, the flow-tree chart(s) may be characterized as a visual illustration of computer code. In some embodiments, a plurality of flow-tree charts are generated for a single topic, such as for the issue of dependents.

In some embodiments and at step 620, the plurality of flow-tree charts are then grouped into the module(s). In some embodiments, the flow-tree charts are grouped into a plurality of modules. In some embodiments, the module(s) include one or more questions. In some embodiments, the tax planning system poses the one or more questions to the user and invites a response from the user via a user input. In some embodiments, the response includes factual elements and/or other tax-related information specific to the user.

In some embodiments and at step 625, the flow-tree chart(s) and the module(s) are then transformed into computer code, thereby generating the tax planning system. The step of transforming the flow-tree chart(s) and module(s) into computer code has also historically been an issue. The problem was that computer code was not advanced enough to support these types of complicated algorithms with millions of different paths and conclusions. However, the development of more sophisticated programming languages, such as Python, have enabled the coding of complex flow-tree charts like the ones contemplated in this disclosure.

Solving these problems now allows for the creation of the tax planning software described herein ("AiTax"), which is capable of performing more sophisticated multi-tiered analyses than any other tax software previously available.

The tax software disclosed herein is able to analyze factual scenarios just like a tax attorney in order to determine whether a person is eligible for a complex legal position.

Figure 7:
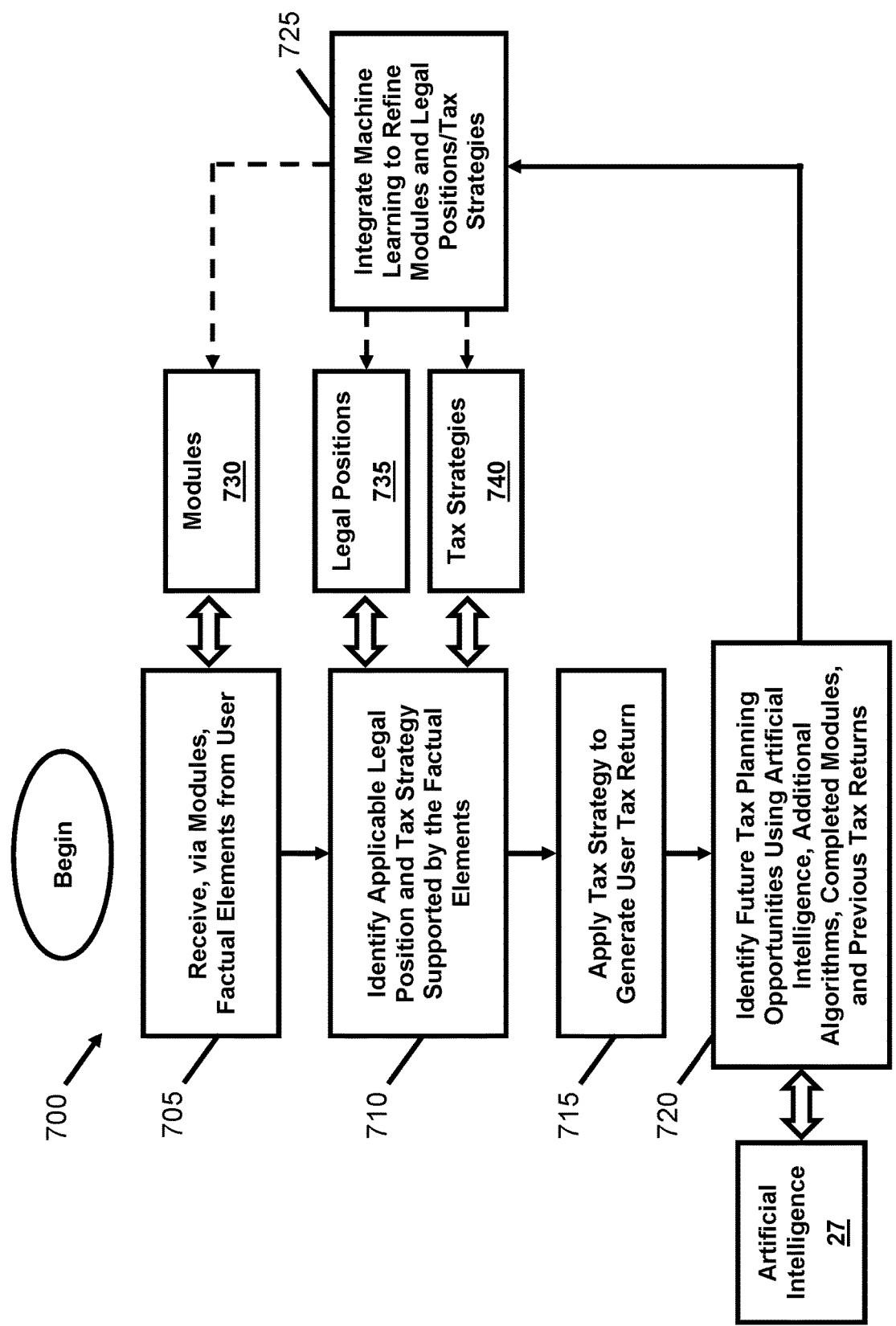
FIG. 7 is a flow chart illustration of a method implemented by the portion of the system created by the method of FIG. 6.

In an example embodiment, as illustrated in FIG. 7, a method 700 includes receiving, via module(s) 730, factual elements from the user at step 705; identifying an applicable legal position(s) 735 and an applicable legal strategy, or strategies, 740 supported by the factual elements at step 710; applying the legal position(s) 735 and tax strategy 740 to generate a user tax return at step 715; identifying future tax planning opportunities using artificial intelligence 27, additional algorithms, completed modules, and/or previous tax returns at step 720; and integrating machine learning to refine the module(s) 730, legal position(s) 735, and/or tax strategies 740 at step 725.

In some embodiments and at step 705, the tax software poses a series of simply-worded factual questions to the user via the module(s) 730.

In some embodiments and at step 710, after receiving and confirming, via the module(s) 730 and from the user, the existence of the factual elements that support a legal position 735, the most applicable tax strategy 740 for that user's specific factual situation is identified.

In some embodiments and at step 715, after identifying the most applicable tax strategy 740 to the user's specific factual situation, the tax strategy 740 is applied to the user's tax return, generating significant savings for the user.

In some embodiments and at step 720, after applying the tax strategy 740 and generating the user tax return, the tax planning software then identifies future tax planning opportunities and makes recommendations to the user using, among other factors, artificial intelligence 27. After the user has completed all modules 730 and submitted the user's tax returns, the tax software runs additional algorithms to identify prospective tax planning opportunities based on the completed return and/or comparing the current year tax return with prior-year tax returns.

In some embodiments and at step 725, the final phase of the tax planning software and method 700 can be characterized as a feedback loop. In some embodiments, machine learning is integrated into the tax software, which allows the software to update itself periodically. In some embodiments these updates occur annually. The machine learning element identifies trends in the federal judiciary and identifies particular law and/or factual elements that may have been overlooked.

The implementation of machine learning into the tax software has numerous other benefits with respect to efficiency. Because the tax software is capable of de-bugging and updating itself, the need for human capital in the IT department is greatly reduced. With the addition of machine learning, the tax planning software is able to execute faster, identify more legally accurate tax strategies 740, and identify and produce improved tax strategies 740 yielding greater returns for the user.

Figure 8:
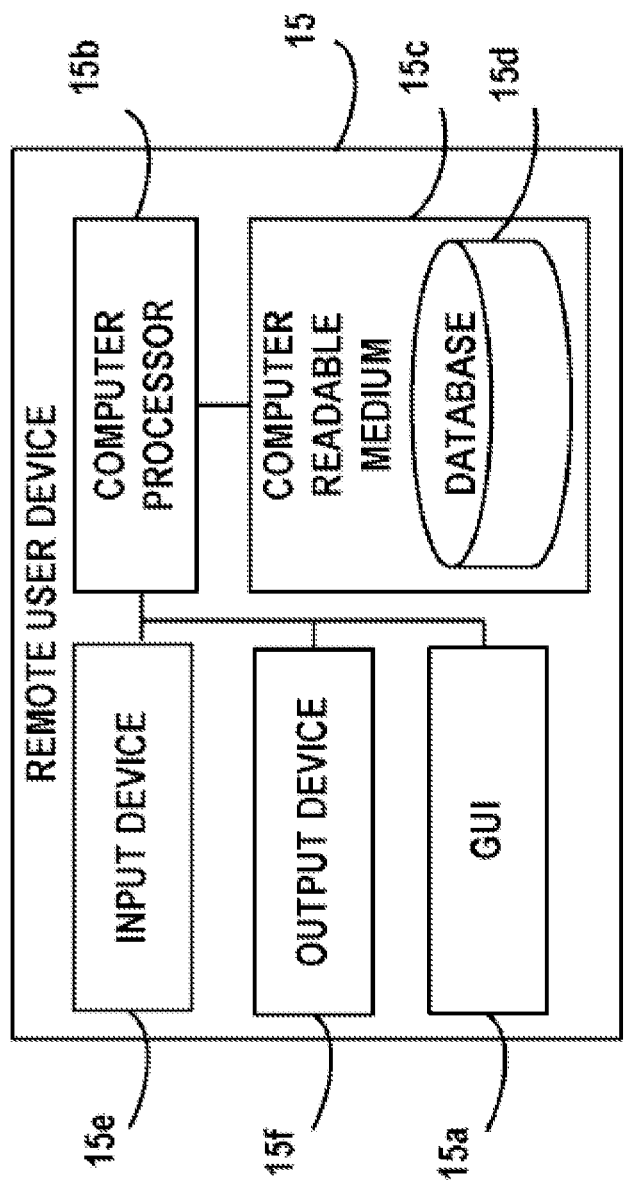
FIG. 8 is a diagrammatic illustration of the remote user device of FIG. 1, according to an example embodiment.

In another embodiment, as illustrated in FIG. 8 with continuing reference to FIG. 1, the remote user device 15 includes the GUI 15a, a computer processor 15b and a computer readable medium 15c operably coupled thereto. Instructions accessible to, and executable by, the computer processor 15b are stored on the computer readable medium 15c. A database 15d is also stored in the computer readable medium 15c. Generally, the GUI 15a is capable of displaying a plurality of windows or screens to the user. The computer 15 also includes an input device 15e and an output device 15f. In some embodiments, the input device 15e and the output device 15f are the GUI 15a.

In some embodiments, the system 10 includes the application or software "AiTax" that has the ability to, based on basic data provided by the client/user, identify factual patterns in user-provided data (839 F.3d 1089) to generate user-specific tax planning solutions (778 Fed.Appx. 935) as well as definitively state whether a taxpayer's legal position on a federal income tax return will result in an IRS audit, be sufficient to avoid penalties, and, if litigated, accurately predict the outcome of a tax court case in any jurisdiction by again analyzing data provided by the client and applying said user-provided data to a previously unknown and novel formulaic technique involving sets of pre-programmed mathematical models, collections of algorithms, and sets of rules to both accurately identify and score the strengths of applicable legal authorities, the ideological inclinations of federal judges, and the ideology of the executive branch when any administrative rulings were issued with self-adjustments for evolutionary computation combined with an entirely novel, video-based graphical user interface that produces a user experience akin to human interaction with a highly-skilled tax professional. (880 F.3d 1356). The manner by which the videos are presented to the user will be based on a system for filtering and presenting only relevant video content from a vast library of explanatory videos. (827 F.3d 1341).

The software/application will also create a single record for accounting, tax planning, and estate planning purposes (841 F.3d 1288) that will be utilized to make complex tax forms, financials, and estate planning documents more simple and easy to generate without the need of having to re-enter any user information. (906 F.3d 999).

The ability to definitively predict whether a taxpayer's legal position on a federal income tax return will result in an IRS audit, be sufficient to avoid penalties, and, if litigated, accurately predict the outcome of a tax court case in any jurisdiction by analyzing data provided by client and applying it to a previously unknown formulaic technique involving sets of pre-programmed mathematical models, collections of algorithms, and sets of rules to both accurately identify and score the strengths of applicable legal authorities and the ideological inclinations of federal judges combined with self-adjustments for evolutionary computation.

In some embodiments, an ideological score is assigned to every federal judge in the U.S. and then the system 10 uses that score to (1) either give deference to taxpayers or the IRS and (2) either give more weight to established case law or consider judicial trends and social impact. Conventional systems have never assigned this score. Scores are also assigned to various legal authorities: case law, statutory language, regulatory interpretation, revenue rulings, revenue procedures, private letter rulings, etc. In some embodiments, the system 10 assigns the score(s) but in other embodiments an administrator of the system 10 assigns the score(s). The legal authorities score is somewhat objective, but the addition of the ideological score considers an interpretation of the authority to account for the legal authority being interpreted in the "eye of the beholder." As such, the interpretation or predicted interpretation is changed when the judicial formula/scoring is applied. The predicted interpretation may indicate interpretation of the authorities in favor of either the taxpayer or the IRS and also predict whether the interpretation would be based more on established case law versus emerging trends. One advantage is that the formula is not static; it's dynamic and ever-changing since new judges are always coming in as older ones retire. In some embodiments, the scores are referenced/used when generating the tax solution. Specifically, in some embodiments the scores are referenced/used when the tax solution includes a prediction or opinion regarding whether portions of the tax solution would be sufficient to avoid penalties, and, if litigated, predict the outcome of a tax court case in any jurisdiction.

In some embodiments, the application is stored in the computer readable medium. In some embodiments, the application includes and/or executes one or more web-based programs, Intranet-based programs, and/or any combination thereof. In an example embodiment, the application includes a computer program including a plurality of instructions, data, and/or any combination thereof. In an example embodiment, the application is written in, for example, HyperText Markup Language (HTML), Cascading Style Sheets (CSS), JavaScript, Extensible Markup Language (XML), asynchronous Javascript and XML (Ajax), and/or any combination thereof. In an example embodiment, the application is a web-based application written in, for example, Java or Adobe Flex, which pulls real-time information from another computer and/or a plurality of data sources. In an example embodiment, the application pulls real-time information from the plurality of data sources, upon the execution, opening or start-up of the application. In an example embodiment, the application is stored on the computer readable medium and/or in the database.

In an example embodiment, the network 30 includes the Internet, one or more local area networks, one or more wide area networks, one or more cellular networks, one or more wireless networks, one or more voice networks, one or more data networks, one or more communication systems, and/or any combination thereof.

Figure 9:
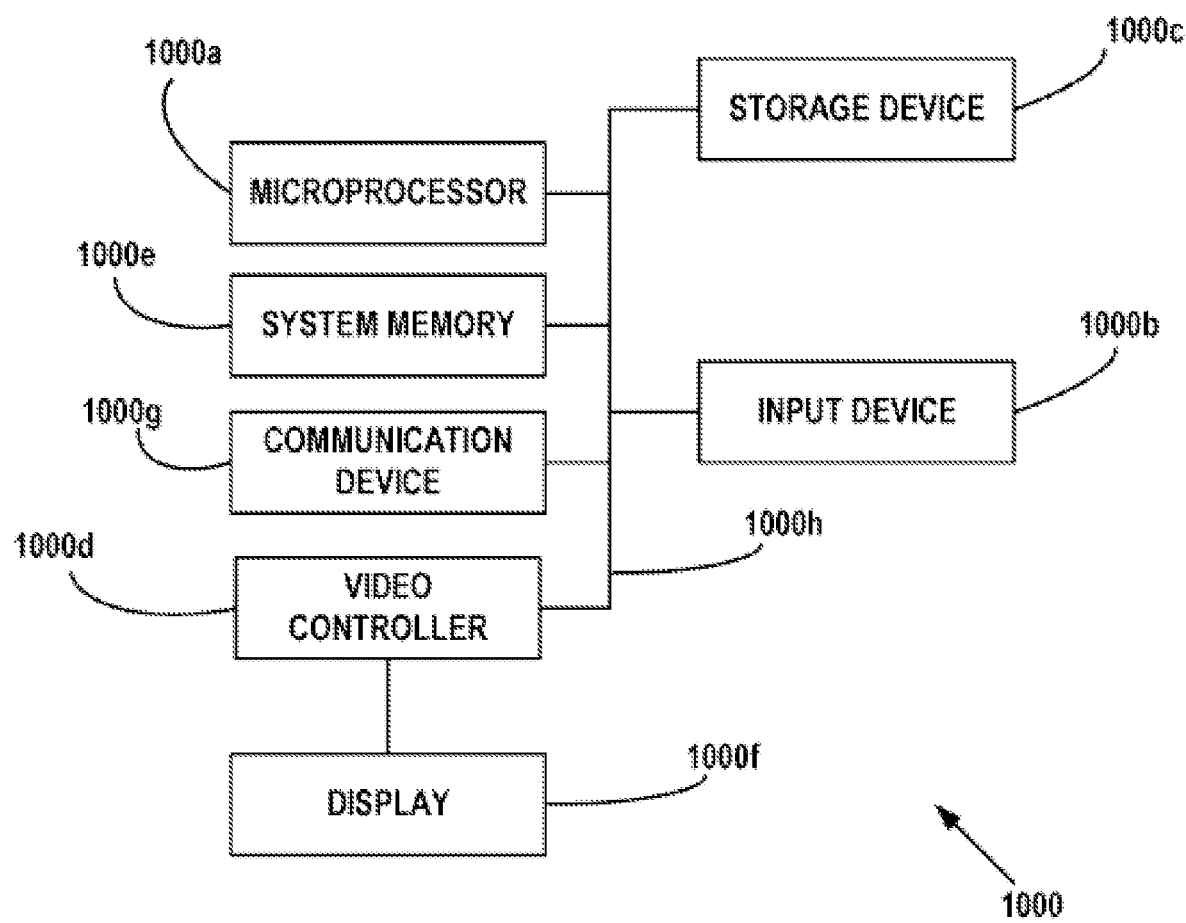
FIG. 9 is a diagrammatic illustration of a node for implementing one or more example embodiments of the present disclosure, according to an example embodiment.

In an example embodiment, as illustrated in FIG. 9 with continuing reference to FIGS. 1-8, an illustrative node 1000 for implementing one or more of the example embodiments described above and/or illustrated in FIGS. 1-8, is depicted. The node 1000 includes a microprocessor 1000a, an input device 1000b, a storage device 1000c, a video controller 1000d, a system memory 1000e, a display 1000f, and a communication device 1000g all interconnected by one or more buses 1000h. In several example embodiments, the storage device 1000c may include a floppy drive, hard drive, CD-ROM, optical drive, any other form of storage device and/or any combination thereof. In several example embodiments, the storage device 1000c may include, and/or be capable of receiving, a floppy disk, CD-ROM, DVD-ROM, or any other form of computer-readable medium that may contain executable instructions. In several example embodiments, the communication device 1000g may include a modem, network card, or any other device to enable the node to communicate with other nodes. In several example embodiments, any node represents a plurality of interconnected (whether by intranet or Internet) computer systems, including without limitation, personal computers, mainframes, PDAS, smartphones, and cell phones.

In several example embodiments, one or more of the components of the systems described above and/or illustrated in FIGS. 1-8, include at least the node 1000 and/or components thereof, and/or one or more nodes that are substantially similar to the node 1000 and/or components thereof. In several example embodiments, one or more of the above-described components of the node 1000, the system 10, and/or the example embodiments described above and/or illustrated in FIGS. 1-8, include respective pluralities of same components.

In several example embodiments, one or more of the applications, systems, and application programs described above and/or illustrated in FIGS. 1-8, include a computer program that includes a plurality of instructions, data, and/or any combination thereof; an application written in, for example, Arena, Hypertext Markup Language (HTML), Cascading Style Sheets (CSS), JavaScript, Extensible Markup Language (XML), asynchronous Javascript and XML (Ajax), and/or any combination thereof; a web-based application written in, for example, Java or Adobe Flex, which in several example embodiments pulls real-time information from one or more servers, automatically refreshing with latest information at a predetermined time increment; or any combination thereof.

In several example embodiments, the system includes a machine learning processing server, which is part of, includes, or is operably coupled to, one or more computer systems. In several example embodiments, the system includes, and the method employs, one or more machine learning models. In several example embodiments, the machine learning model(s) include or includes one or more of the following: Linear Regression; Logistic Regression; Decision Tree; a Support Vector Machine model (SVM); Naive Bayes (NB); a Deep Learning model; k-nearest neighbors algorithm (k-NN); K-Means; Random Forest (RF); Dimensionality Reduction Algorithms; Gradient Boosting algorithms (e.g., GBM, XGBoost, LightGBM, CatBoost).

In several example embodiments, a computer system typically includes at least hardware capable of executing machine readable instructions, as well as the software for executing acts (typically machine-readable instructions) that produce a desired result. In several example embodiments, a computer system may include hybrids of hardware and software, as well as computer sub-systems.

In several example embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several example embodiments, hardware may include any physical device that is capable of storing machine-readable instructions, such as memory or other data storage devices. In several example embodiments, other forms of hardware include hardware sub-systems, including transfer devices such as modems, modem cards, ports, and port cards, for example.

In several example embodiments, software includes any machine code stored in any memory medium, such as RAM or ROM, and machine code stored on other devices (such as floppy disks, flash memory, or a CD ROM, for example). In several example embodiments, software may include source or object code. In several example embodiments, software encompasses any set of instructions capable of being executed on a node such as, for example, on a client machine or server.

In several example embodiments, combinations of software and hardware could also be used for providing enhanced functionality and performance for certain embodiments of the present disclosure. In an example embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several example embodiments, computer readable mediums include, for example, passive data storage, such as a random-access memory (RAM) as well as semi-permanent data storage such as a compact disk read only memory (CD-ROM). One or more example embodiments of the present disclosure may be embodied in the RAM of a computer to transform a standard computer into a new specific computing machine. In several example embodiments, data structures are defined organizations of data that may enable an embodiment of the present disclosure. In an example embodiment, a data structure may provide an organization of data, or an organization of executable code.

In several example embodiments, any networks and/or one or more portions thereof may be designed to work on any specific architecture. In an example embodiment, one or more portions of any networks may be executed on a single computer, local area networks, client-server networks, wide area networks, internets, hand-held and other portable and wireless devices, and networks.

In several example embodiments, a database may be any standard or proprietary database software. In several example embodiments, the database may have fields, records, data, and other database elements that may be associated through database specific software. In several example embodiments, data may be mapped. In several example embodiments, mapping is the process of associating one data entry with another data entry. In an example embodiment, the data contained in the location of a character file can be mapped to a field in a second table. In several example embodiments, the physical location of the database is not limiting, and the database may be distributed. In an example embodiment, the database may exist remotely from the server, and run on a separate platform. In an example embodiment, the database may be accessible across the Internet. In several example embodiments, more than one database may be implemented.

In several example embodiments, a plurality of instructions stored on a non-transitory computer readable medium may be executed by one or more processors to cause the one or more processors to carry out or implement in whole or in part the above-described operation of each of the above-described example embodiments of the system, the method, and/or any combination thereof. In several example embodiments, such a processor may include one or more of the microprocessor 1000a, any processor(s) that are part of the components of the system, and/or any combination thereof, and such a computer readable medium may be distributed among one or more components of the system. In several example embodiments, such a processor may execute the plurality of instructions in connection with a virtual computer system. In several example embodiments, such a plurality of instructions may communicate directly with the one or more processors, and/or may interact with one or more operating systems, middleware, firmware, other applications, and/or any combination thereof, to cause the one or more processors to execute the instructions.

The present disclosure introduces a method of generating and presenting a recommended tax filing strategy, the method comprising: receiving, using a graphical user interface, a first user input; identifying, using one or more computers and the first user input, tax-related information for use in an optimization model; accessing a first tax-related legal document; generating, using the optimization model, and based on the tax-related information and the first tax-related legal document, the recommended tax filing strategy; creating a combined media file from a plurality of media files, wherein the combined media file is customized based on the first user input and the recommended tax filing strategy; presenting the combined media file via the graphical user interface, wherein the combined media file explains the recommended tax filing strategy; and prepopulating a first template using the recommended tax filing strategy and the first user input. In one embodiment, the method also includes receiving, using the graphical user interface, user inputs, the user inputs comprising the first user input; accessing tax-related legal documents, the tax-related legal documents comprising the first tax-related legal document; and prepopulating templates using the recommended tax filing strategy and the user inputs, the templates comprising the first template. In one embodiment, the first tax-related legal document is associated with a federal judge. In one embodiment, the method also includes assigning an ideological score to the federal judge based on 1) deference to taxpayers, 2) weight given to established case law or judicial trends and social impacts, or 3) both 1) and 2); wherein the recommended tax filing strategy is generated using the ideological score of the federal judge. In one embodiment, the method also includes iteratively updating the ideological score based on newly entered judicial data. In one embodiment, the method also includes predicting, using the optimization model, an interpretation of the recommended tax filing strategy by the federal judge. In one embodiment, the interpretation of the recommended tax filing strategy by the federal judge comprises a first interpretation in favor of a government entity or a second interpretation in favor of a non-government entity. In one embodiment, the optimization model assigns a strength score to the first tax-related legal document; and wherein the recommended tax filing strategy is generated using the strength score of the first tax-related legal document. In one embodiment, the method also includes assigning, using the one or more computers and based on the first user input, a risk tolerance classification; wherein the recommended tax filing strategy is generated using the risk tolerance classification. In one embodiment, the method also includes identifying, using the one or more computers, patterns for use in the optimization model; wherein the risk tolerance classification is based on the identified patterns.

The present disclosure introduces an apparatus configured to generate and present a recommended tax filing strategy, the apparatus comprising one or more processors executing instructions comprising: receiving, using a graphical user interface, a first user input; identifying, using the first user input, tax-related information for use in an optimization model; accessing a first tax-related legal document; generating, using the optimization model, and based on the tax-related information and the first tax-related legal document, the recommended tax filing strategy; creating a combined media file from a plurality of media files, wherein the combined media file is customized based on the first user input and the recommended tax filing strategy; presenting the combined media file via the graphical user interface, wherein the combined media file explains the recommended tax filing strategy; and prepopulating a first template using the recommended tax filing strategy and the first user input. In one embodiment, the instructions also include receiving, using the graphical user interface, user inputs, the user inputs comprising the first user input; accessing tax-related legal documents, the tax-related legal documents comprising the first tax-related legal document; and prepopulating templates using the recommended tax filing strategy and the user inputs, the templates comprising the first template. In one embodiment, the first tax-related legal document is associated with a federal judge. In one embodiment, the instructions also include assigning an ideological score to the federal judge based on 1) deference to taxpayers, 2) weight given to established case law or judicial trends and social impacts, or 3) both 1) and 2); wherein the recommended tax filing strategy is generated using the ideological score of the federal judge. In one embodiment, the instructions also include iteratively updating the ideological score based on newly entered judicial data. In one embodiment, the instructions also include predicting, using the optimization model, an interpretation of the recommended tax filing strategy by the federal judge. In one embodiment, the interpretation of the recommended tax filing strategy by the federal judge comprises a first interpretation in favor of a government entity or a second interpretation in favor of a non-government entity. In one embodiment, the optimization model assigns a strength score to the first tax-related legal document; and wherein the recommended tax filing strategy is generated using the strength score of the first tax-related legal document. In one embodiment, the instructions also include assigning, based on the first user input, a risk tolerance classification; wherein the recommended tax filing strategy is generated using the risk tolerance classification. In one embodiment, the instructions also include identifying patterns for use in the optimization model; wherein the risk tolerance classification is based on the identified patterns.

The present disclosure introduces a method of generating and presenting a recommended tax filing strategy, the method comprising: receiving, using a graphical user interface, a first user input; identifying, using one or more computers and the first user input, tax-related information for use in an optimization model; accessing a first tax-related legal document; generating, using the optimization model, and based on the tax-related information and the first tax-related legal document, the recommended tax filing strategy; creating a combined media file from a plurality of media files, wherein the combined media file is customized based on the first user input and the recommended tax filing strategy; presenting the combined media file via the graphical user interface, wherein the combined media file explains the recommended tax filing strategy; prepopulating a first template using the recommended tax filing strategy and the first user input; identifying, using the one or more computers, additional tax-related information and trends in the federal judiciary; and updating the optimization model using the additional tax-related information and the trends in the federal judiciary. In one embodiment, the method also includes displaying, via the graphical user interface, a module comprising a plurality of tax-related questions; and receiving, via the module and using the graphical user interface, the first user input. In one embodiment, the method also includes generating the prospective recommended tax filing strategy using the updated optimization model and the recommended tax filing strategy. In one embodiment, the prospective recommended tax filing strategy is generated using the updated optimization model and by comparing the recommended tax filing strategy with a previous tax filing strategy. In one embodiment, the method also includes receiving, using the graphical user interface, user inputs, the user inputs comprising the first user input; accessing tax-related legal documents, the tax-related legal documents comprising the first tax-related legal document; and prepopulating templates using the recommended tax filing strategy and the user inputs, the templates comprising the first template. In one embodiment, the first tax-related legal document is associated with a federal judge. In one embodiment, the method also includes assigning an ideological score to the federal judge based on 1) deference to taxpayers, 2) weight given to established case law or judicial trends and social impacts, or 3) both 1) and 2); wherein the recommended tax filing strategy is generated using the ideological score of the federal judge. In one embodiment, the method also includes iteratively updating the ideological score based on newly entered judicial data. In one embodiment, the method also includes predicting, using the optimization model, an interpretation of the recommended tax filing strategy by the federal judge. In one embodiment, the interpretation of the recommended tax filing strategy by the federal judge comprises a first interpretation in favor of a government entity or a second interpretation in favor of a non-government entity. In one embodiment, the optimization model assigns a strength score to the first tax-related legal document; and the recommended tax filing strategy is generated using the strength score of the first tax-related legal document. In one embodiment, the method also includes assigning, using the one or more computers and based on the first user input, a risk tolerance classification; wherein the recommended tax filing strategy is generated using the risk tolerance classification. In one embodiment, the method also includes identifying, using the one or more computers, patterns for use in the optimization model; wherein the risk tolerance classification is based on the identified patterns.

The present disclosure also introduces a method of generating and presenting a recommended tax filing strategy, the method comprising: receiving, using a graphical user interface, a first user input; identifying, using one or more computers and the first user input, tax-related information for use in an optimization model; identifying, using the one or more computers, patterns for use in the optimization model; assigning, using the one or more computers, and based on the first user input and the identified patterns, a risk tolerance classification; accessing a first tax-related legal document; wherein the first tax-related legal document is associated with a federal judge; and wherein the optimization model assigns a strength score to the first tax-related legal document; generating, using the optimization model and the risk tolerance classification, and based on the tax-related information, the first tax-related legal document, and the strength score of the first tax-related legal document, the recommended tax filing strategy; creating a combined media file from a plurality of media files, wherein the combined media file is customized based on the first user input and the recommended tax filing strategy; presenting the combined media file via the graphical user interface, wherein the combined media file explains the recommended tax filing strategy; and prepopulating a first template using the recommended tax filing strategy and the first user input. In one embodiment, the method also includes receiving, using the graphical user interface, user inputs, the user inputs comprising the first user input; accessing tax-related legal documents, the tax-related legal documents comprising the first tax-related legal document; and prepopulating templates using the recommended tax filing strategy and the user inputs, the templates comprising the first template. In one embodiment, the method also includes assigning an ideological score to the federal judge based on 1) deference to taxpayers, 2) weight given to established case law or judicial trends and social impacts, or 3) both 1) and 2); wherein the recommended tax filing strategy is generated using the ideological score of the federal judge. In one embodiment, the method also includes iteratively updating the ideological score based on newly entered judicial data. In one embodiment, the method also includes predicting, using the optimization model, an interpretation of the recommended tax filing strategy by the federal judge. In one embodiment, the interpretation of the recommended tax filing strategy by the federal judge comprises a first interpretation in favor of a government entity or a second interpretation in favor of a non-government entity.

The present disclosure also introduces an apparatus configured to generate and present a recommended tax filing strategy, the apparatus comprising one or more processors executing instructions comprising: receiving, using a graphical user interface, a first user input; identifying, using the first user input, tax-related information for use in an optimization model; accessing a first tax-related legal document; generating, using the optimization model, and based on the tax-related information and the first tax-related legal document, the recommended tax filing strategy; creating a combined media file from a plurality of media files, wherein the combined media file is customized based on the first user input and the recommended tax filing strategy; presenting the combined media file via the graphical user interface, wherein the combined media file explains the recommended tax filing strategy; prepopulating a first template using the recommended tax filing strategy and the first user input; identifying, using the one or more computers, additional tax-related information and trends in the federal judiciary; and updating the optimization model using the additional tax-related information and the trends in the federal judiciary. In one embodiment, the instructions also include displaying, via the graphical user interface, a module comprising a plurality of tax-related questions; and receiving, via the module and using the graphical user interface, the first user input. In one embodiment, the instructions also include generating the prospective recommended tax filing strategy using the updated optimization model and the recommended tax filing strategy. In one embodiment, the prospective recommended tax filing strategy is generated using the updated optimization model and by comparing the recommended tax filing strategy with a previous tax filing strategy. In one embodiment, the instructions also include receiving, using the graphical user interface, user inputs, the user inputs comprising the first user input; accessing tax-related legal documents, the tax-related legal documents comprising the first tax-related legal document; and prepopulating templates using the recommended tax filing strategy and the user inputs, the templates comprising the first template. In one embodiment, the first tax-related legal document is associated with a federal judge. In one embodiment, the instructions also include assigning an ideological score to the federal judge based on 1) deference to taxpayers, 2) weight given to established case law or judicial trends and social impacts, or 3) both 1) and 2); wherein the recommended tax filing strategy is generated using the ideological score of the federal judge. In one embodiment, the instructions also include iteratively updating the ideological score based on newly entered judicial data. In one embodiment, the instructions also include predicting, using the optimization model, an interpretation of the recommended tax filing strategy by the federal judge. In one embodiment, the interpretation of the recommended tax filing strategy by the federal judge comprises a first interpretation in favor of a government entity or a second interpretation in favor of a non-government entity. In one embodiment, the optimization model assigns a strength score to the first tax-related legal document; and the recommended tax filing strategy is generated using the strength score of the first tax-related legal document. In one embodiment, the instructions also include assigning, based on the first user input, a risk tolerance classification; wherein the recommended tax filing strategy is generated using the risk tolerance classification. In one embodiment, the instructions also include identifying patterns for use in the optimization model; wherein the risk tolerance classification is based on the identified patterns.

The present disclosure also introduces an apparatus configured to generate and present a recommended tax filing strategy, the apparatus comprising one or more processors executing instructions comprising: receiving, using a graphical user interface, a first user input; identifying, using one or more computers and the first user input, tax-related information for use in an optimization model; identifying, using the one or more computers, patterns for use in the optimization model; assigning, using the one or more computers, and based on the first user input and the identified patterns, a risk tolerance classification; accessing a first tax-related legal document; wherein the first tax-related legal document is associated with a federal judge; and wherein the optimization model assigns a strength score to the first tax-related legal document; generating, using the optimization model and the risk tolerance classification, and based on the tax-related information, the first tax-related legal document, and the strength score of the first tax-related legal document, the recommended tax filing strategy; creating a combined media file from a plurality of media files, wherein the combined media file is customized based on the first user input and the recommended tax filing strategy; presenting the combined media file via the graphical user interface, wherein the combined media file explains the recommended tax filing strategy; and prepopulating a first template using the recommended tax filing strategy and the first user input. In one embodiment, the instructions also include receiving, using the graphical user interface, user inputs, the user inputs comprising the first user input; accessing tax-related legal documents, the tax-related legal documents comprising the first tax-related legal document; and prepopulating templates using the recommended tax filing strategy and the user inputs, the templates comprising the first template. In one embodiment, the instructions also include assigning an ideological score to the federal judge based on 1) deference to taxpayers, 2) weight given to established case law or judicial trends and social impacts, or 3) both 1) and 2); wherein the recommended tax filing strategy is generated using the ideological score of the federal judge. In one embodiment, the instructions also include iteratively updating the ideological score based on newly entered judicial data. In one embodiment, the instructions also include predicting, using the optimization model, an interpretation of the recommended tax filing strategy by the federal judge. In one embodiment, the interpretation of the recommended tax filing strategy by the federal judge comprises a first interpretation in favor of a government entity or a second interpretation in favor of a non-government entity.

It is understood that variations may be made in the foregoing without departing from the scope of the disclosure.

In several example embodiments, the elements and teachings of the various illustrative example embodiments may be combined in whole or in part in some or all of the illustrative example embodiments. In addition, one or more of the elements and teachings of the various illustrative example embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several example embodiments, while different steps, processes, and procedures are described as appearing as distinct acts, one or more of the steps, one or more of the processes, and/or one or more of the procedures may also be performed in different orders, simultaneously, and/or sequentially. In several example embodiments, the steps, processes and/or procedures may be merged into one or more steps, processes, and/or procedures.

In several example embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

The phrase "at least one of A and B" should be understood to mean "A, B, or both A and B." The phrase "one or more of the following: A, B, and C" should be understood to mean "A, B, C, A and B, B and C, A and C, or all three of A, B, and C." The phrase "one or more of A, B, and C" should be understood to mean "A, B, C, A and B, B and C, A and C, or all three of A, B, and C."

Although several example embodiments have been described in detail above, the embodiments described are examples only and are not limiting, and those skilled in the art will readily appreciate that many other modifications, changes, and/or substitutions are possible in the example embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112(f) for any limitations of any of the claims herein, except for those in which the claim expressly uses the word "means" together with an associated function.

What is claimed is:

1. A method, comprising:
  receiving, via user input(s) of a graphical user interface, first factual elements associated with module(s);
  identifying, using one or more processors:
    an applicable first legal position from a plurality of legal positions stored on a non-transitory computer readable medium; and
    a present legal strategy from a plurality of legal strategies stored on the non-transitory computer readable medium,
    wherein the present legal strategy is supported by the first factual elements and a legal document;
  applying, using the one or more processors, the present legal strategy to generate first legal work product based on the first factual elements and the applicable first legal position;
  identifying, using artificial intelligence, a future legal strategy based on the legal work product;
and
  updating, using machine learning, the module(s), the plurality of legal positions, and the plurality of legal strategies;

wherein the step of updating is based on the future legal strategy identified using artificial intelligence;
wherein the legal document is associated with a federal judge;
wherein the method further comprises analyzing ideological inclination(s) associated with the federal judge based on court case(s); and
wherein the present legal strategy is based on the analysis of the ideological inclination(s) associated with the federal judge and a prediction of the outcome of the present legal strategy based on said analysis of the ideological inclination(s) associated with the federal judge.

2. The method of claim 1, further comprising:
receiving, via the user input(s) of the graphical user interface, second factual elements associated with the updated module(s);
identifying, using the one or more processors:
 an applicable second legal position from the updated plurality of legal positions stored on the non-transitory computer readable medium; and
 another present legal strategy from the updated plurality of legal strategies stored on the non-transitory computer readable medium,
 wherein the another present legal strategy is supported by the second factual elements; and
applying, using the one or more processors, the another present legal strategy to generate second legal work product based on the second factual elements and the applicable second legal position;
wherein the another present legal strategy reflects the updates made, using machine learning, to the module(s), the plurality of legal positions, and the plurality of legal strategies, and thus the second legal work product reflects the updates made, using machine learning, to the module(s), the plurality of legal positions, and the plurality of legal strategies.

3. The method of claim 1, wherein:
the plurality of legal strategies is a plurality of tax strategies; and
the first legal work product is: a tax return; a tax solution; a tax prediction; a tax opinion; tax advice; or any combination thereof.

4. The method of claim 1, further comprising:
presenting the first legal work product via the graphical user interface, the first legal work product explaining the present legal strategy.

5. The method of claim 1, further comprising:
transforming the module(s) into computer code executable by the one or processors;
wherein execution of the computer code generates the user input(s) of the graphical user interface via which the first factual elements are received.

6. The method of claim 5, further comprising:
grouping flow-tree charts into the module(s).

7. The method of claim 6, wherein the flow-tree charts are grouped into the module(s) before the module(s) are transformed into the computer code executable by the one or more processors.

8. The method of claim 6, further comprising:
generating the flow-tree charts for a single topic.

9. The method of claim 8,
wherein the single topic is a tax topic related to the issue of dependents;
wherein the plurality of legal strategies is a plurality of tax strategies; and
wherein the first legal work product is: a tax return; a tax solution; a tax prediction; a tax opinion; tax advice; or any combination thereof.

10. The method of claim 6, further comprising:
transforming, using the one or more processors, a matrix into the flow-tree chart(s);
wherein the first factual elements are ordered within the matrix based on a hierarchy of relevance.

11. An apparatus comprising one or more processors executing instructions comprising:
receiving, via user input(s) of a graphical user interface, first factual elements associated with module(s);
identifying:
 an applicable first legal position from a plurality of legal positions stored on a non-transitory computer readable medium; and
 a present legal strategy from a plurality of legal strategies stored on the non-transitory computer readable medium,
 wherein the present legal strategy is supported by the first factual elements and a legal document;
applying the present legal strategy to generate first legal work product based on the first factual elements and the applicable first legal position;
identifying, using artificial intelligence, a future legal strategy based on the legal work product; and
updating, using machine learning, the module(s), the plurality of legal positions, and the plurality of legal strategies;
wherein the step of updating is based on the future legal strategy identified using artificial intelligence;
wherein the legal document is associated with a federal judge;
wherein the instructions further comprise analyzing ideological inclination(s) associated with the federal judge based on court case(s); and
wherein the present legal strategy is based on the analysis of the ideological inclination(s) associated with the federal judge and a prediction of the outcome of the present legal strategy based on said analysis of the ideological inclination(s) associated with the federal judge.

12. The apparatus of claim 11, wherein the instructions further comprise:
receiving, via the user input(s) of the graphical user interface, second factual elements associated with the updated module(s);
identifying:
 an applicable second legal position from the updated plurality of legal positions stored on the non-transitory computer readable medium; and
 another present legal strategy from the updated plurality of legal strategies stored on the non-transitory computer readable medium,
 wherein the another present legal strategy is supported by the second factual elements; and
applying the another present legal strategy to generate second legal work product based on the second factual elements and the applicable second legal position;
wherein the another present legal strategy reflects the updates made, using machine learning, to the module(s), the plurality of legal positions, and the plurality of legal strategies, and thus the second legal work product reflects the updates made, using machine learning, to the module(s), the plurality of legal positions, and the plurality of legal strategies.

13. The apparatus of claim 11, wherein:
the plurality of legal strategies is a plurality of tax strategies; and
the first legal work product is: a tax return; a tax solution; a tax prediction; a tax opinion; tax advice; or any combination thereof.

14. The apparatus of claim 11, wherein the instructions further comprise:
presenting the first legal work product via the graphical user interface, the first legal work product explaining the present legal strategy.

15. The apparatus of claim 11, wherein the instructions further comprise:
transforming the module(s) into computer code executable by the one or processors;
wherein execution of the computer code generates the user input(s) of the graphical user interface via which the first factual elements are received.

16. The apparatus of claim 15, wherein the instructions further comprise:
grouping flow-tree charts into the module(s).

17. The apparatus of claim 16, wherein the flow-tree charts are grouped into the module(s) before the module(s) are transformed into the computer code executable by the one or more processors.

18. The apparatus of claim 16, further comprising:
generating the flow-tree charts for a single topic.

19. The apparatus of claim 18,
wherein the single topic is a tax topic related to the issue of dependents;
wherein the plurality of legal strategies is a plurality of tax strategies; and
wherein the first legal work product is: a tax return; a tax solution; a tax prediction; a tax opinion; tax advice; or any combination thereof.

20. The apparatus of claim 16, wherein the instructions further comprise:
transforming a matrix into the flow-tree chart(s);
wherein the first factual elements are ordered within the matrix based on a hierarchy of relevance.

* * * * *